US010731603B2

(12) United States Patent
Jolivet

(10) Patent No.: US 10,731,603 B2
(45) Date of Patent: Aug. 4, 2020

(54) JET ENGINE NACELLE HAVING A REVERSER FLAP

(71) Applicant: Airbus Operations (S.A.S.), Toulouse (FR)

(72) Inventor: Nicolas Jolivet, Fontenilles (FR)

(73) Assignee: Airbus Operations (S.A.S.), Toulouse (FR)

( * ) Notice: Subject to any disclaimer, the term of this patent is extended or adjusted under 35 U.S.C. 154(b) by 315 days.

(21) Appl. No.: 15/927,822

(22) Filed: Mar. 21, 2018

(65) Prior Publication Data
US 2018/0283320 A1 Oct. 4, 2018

(30) Foreign Application Priority Data

Mar. 22, 2017 (FR) ...................................... 17 52348

(51) Int. Cl.
*F02K 1/76* (2006.01)
*F02K 1/72* (2006.01)
(52) U.S. Cl.
CPC ................ *F02K 1/763* (2013.01); *F02K 1/72* (2013.01); *F02K 1/766* (2013.01); *F05D 2260/50* (2013.01)
(58) Field of Classification Search
CPC ... F02K 1/625; F02K 1/62; F02K 1/70; F02K 1/72; F02K 1/763; F02K 1/766; F02K 1/80
See application file for complete search history.

(56) References Cited

U.S. PATENT DOCUMENTS 3,503,211 A * 3/1970 Holman .................... F02K 1/72
60/229
4,147,029 A * 4/1979 Sargisson ................ F02C 7/042
137/15.1
2012/0193441 A1 * 8/2012 Parham .................. B64D 33/06
239/11
2014/0131480 A1 * 5/2014 Hurlin ....................... F02K 1/72
239/265.19
2015/0267641 A1 * 9/2015 Gormley ................... F02K 1/72
239/265.19
2016/0169157 A1 6/2016 Sawyers-Abbott et al.
2018/0038313 A1 * 2/2018 Wawrzynek .............. F02K 1/72

FOREIGN PATENT DOCUMENTS

EP 2484591 A2 8/2012

OTHER PUBLICATIONS

French Search Report for French Application 1752348 dated Dec. 6, 2017.

* cited by examiner

*Primary Examiner* — Andrew H Nguyen
(74) *Attorney, Agent, or Firm* — Jenkins, Wilson Taylor & Hunt, P.A.

(57) ABSTRACT

A nacelle for a turbofan including a mobile cowl mobile in translation between a closing position and an opening position, a window on the upstream side by a fixed cowl and on the downstream side by the mobile cowl, and a reverser flap in rotation between a closed position and an open position. The nacelle includes a locking system with a groove fixed to the mobile cowl and extending between a first end and a second end, and a guided element mounted guided in the slide and fixed to the reverser flap, the guided element moving from the second end towards the first end with cowl movement and leaving the groove when the reverser flap begins rotation, and the guided element moving outside the groove while the reverser flap pivots from the positions and entering the groove at the end of rotation of the reverser flap.

6 Claims, 3 Drawing Sheets

JET ENGINE NACELLE HAVING A REVERSER FLAP

CROSS-REFERENCE TO RELATED APPLICATION

This patent application claims priority to French patent application FR 17 52348, filed on Mar. 22, 2017, the entire disclosure of which is incorporated by reference herein.

TECHNICAL FIELD

The present disclosure relates to a nacelle for a turbofan that comprises at least one reverser flap, to a turbofan comprising a nacelle of that kind and an engine, and to an aircraft comprising at least one such turbofan.

BACKGROUND

An aircraft includes a fuselage to each side of which is fixed a wing. Under each wing is suspended at least one turbofan. Each turbofan is fixed under the wing by a pylon that is fixed between the structure of the wing and the structure of the turbofan.

The turbofan comprises an engine and a nacelle that is fixed around the engine.

The nacelle comprises at least one reverser flap that is mobile between a closed position in which it becomes continuous with the exterior surface of the nacelle and an open position in which it opens a window in the wall of the nacelle to expel the air of the bypass flow to the outside.

The reverser flap is mounted mobile in rotation on the structure of the nacelle so as to pass from a closed position in which the reverser flap does not obstruct the bypass flow duct to an open position in which the reverser flap obstructs the duct.

Accordingly, in the open position, the reverser flap deflects a part of the bypass flow to the outside via the window.

Although the mechanism of a reverser flap of this kind is satisfactory, it is desirable to find different mechanisms.

SUMMARY

The present disclosure has an object of proposing a nacelle comprising at least one reverser flap with a different opening mechanism.

To that end, there is proposed a nacelle for a turbofan, the nacelle comprising:

- a fixed cowl and a mobile cowl mobile in translation in a translation direction between a closing position in which it is close to the fixed cowl and an opening position in which it is far aft of the fixed cowl;
- an actuator intended for moving the mobile cowl from the closing position to the opening position, and vice versa;
- a window delimited or disposed on the upstream side by the fixed cowl and on the downstream side by the mobile cowl, the window being open between a duct for a bypass flow and the exterior of the nacelle;
- a reverser flap mounted mobile in rotation about a rotation axis between a closed position in which it obstructs the window and an open position in which it does not obstruct the window; and
- a drive mechanism adapted or configured to coordinate and defer the passage from the closed position to the open position of the reverser flap with the passage from the closing position to the opening position of the mobile cowl and vice versa, the drive mechanism being adapted or configured to realize a first combination bringing about, from the closed position and from the closing position:
  - an aft translation of the mobile cowl in the translation direction to move the mobile cowl from the closing position to the opening position, then, from a certain moment;
  - a rotation of the reverser flap about the rotation axis to move the reverser flap from the closed position to the open position; and
  the drive mechanism is also adapted or configured to realize a second combination bringing about, from the open position and from the opening position:
  - a forward translation of the mobile cowl in the translation direction to move the mobile cowl from the opening position to the closing position; and
  - a rotation in the reverse direction of the reverser flap about the rotation axis to move the reverser flap from the open position to the closed position;
  the nacelle further comprising a locking system comprising:
  - a groove bounded laterally by two walls that are essentially parallel to the translation direction and are fixed to the mobile cowl, the groove extending between a first end that is oriented forward and open and a second end;
  - a guided element which is guided in the slide and is fixed to the reverser flap, the guided element moving from the second end towards the first end with the movement of the mobile cowl from its closing position towards its opening position and leaving the groove by the first end when the reverser flap begins its rotation to pass from the closed position to the open position, and the guided element moving outside the groove while the reverser flap pivots from its open position to its closed position and while the mobile cowl moves from its opening position towards its closing position, and entering the groove by its first end at the end of the rotation of the reverser flap then moving from the first end to the second end with the continued movement of the mobile cowl up to its closing position.

Advantageously, the first end is widened.

Advantageously, the first end is extended by an arcuate portion such that, in the direction of movement of the mobile cowl, on one hand it aids in initiation of the rotation of the reverser flap from its closed position towards its open position, and on the other hand it accompanies the end of the rotation of the reverser flap from its open position towards its closed position.

Advantageously, the second end of the groove has a curvature which orients the second end towards the outside of the nacelle.

The disclosure herein also proposes a turbofan comprising an engine and any of the above variants of a nacelle surrounding the engine, and in which a duct for a bypass flow is delimited between the nacelle and the engine.

The disclosure herein also proposes an aircraft comprising at least one turbofan in accordance with the above variant.

BRIEF DESCRIPTION OF THE DRAWINGS

Features of the disclosure herein mentioned above, along with others, will become more clearly apparent on reading the following description of one exemplary embodiment, the description being given with reference to the appended, example drawings, in which.

DETAILED DESCRIPTION

Figure 1:
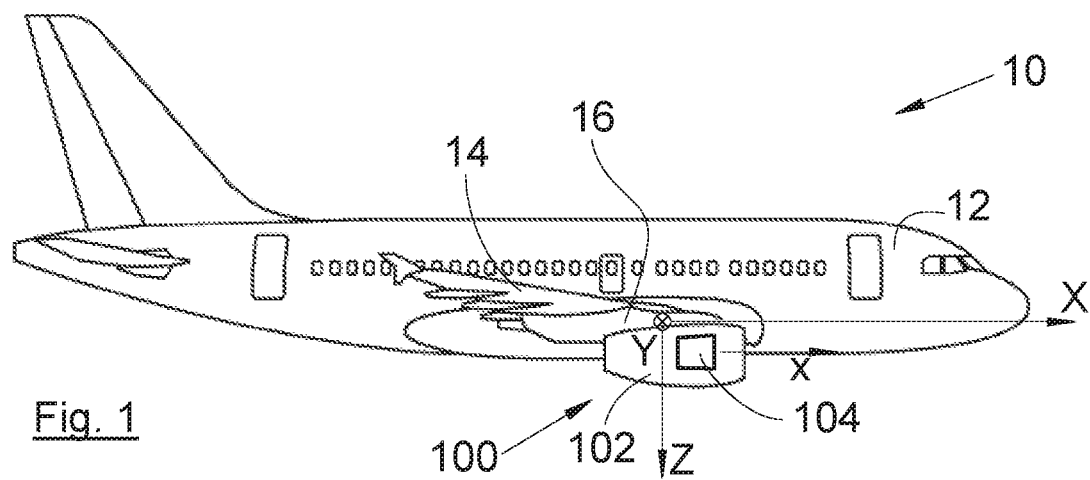
FIG. 1 is a side view of an aircraft comprising a nacelle according to the disclosure herein.

In the following description, terms relating to a position are provided in relation to an aircraft in a forward movement position as shown in FIG. 1.

FIG. 1 shows an aircraft 10 that comprises a fuselage 12, to each side of which is fixed a wing 14 that bears at least one turbofan 100 according to the disclosure herein. The turbofan 100 is fixed under the wing 14 by a pylon 16.

The turbofan 100 comprises the nacelle 102, and an engine 20 that is housed inside the nacelle 102, and a duct 202 between the nacelle 102, and the engine 20, in which flows the bypass flow 208.

In the following description, and by convention, x denotes the longitudinal axis of the nacelle 102 that is parallel to the longitudinal or roll axis X of the aircraft 10 oriented positively in the direction of forward movement of the aircraft 10, Y denotes the transverse axis or pitch axis of the aircraft which is horizontal when the aircraft is on the ground, and Z denotes the vertical axis or vertical height or yaw axis when the aircraft is on the ground, these three directions X, Y and Z being mutually orthogonal and forming an orthonormal frame of reference the origin of which is the center of gravity of the aircraft.

The nacelle 102 comprises at least one reverser flap 104. In particular, there can be two reverser flaps 104 arranged opposite one another, or four reverser flaps 104 regularly distributed over the periphery of the nacelle 102.

In the following description, the disclosure herein is more particularly described for one reverser flap 104, but the description applies in the same manner to each reverser flap 104 when there is more than one of these.

For each reverser flap 104 the nacelle 102 comprises a window 210 that is open between the duct 202 and the exterior of the nacelle 102.

The nacelle 102 features a fixed cowl 206, which in this case is a forward frame, that delimits the window 210 on the upstream side relative to the longitudinal axis x and that is fixedly mounted on a structure of the nacelle 102.

The nacelle 102 has a mobile cowl 207 that delimits or defines the window 210 on the downstream side relative to the longitudinal axis x. The mobile cowl 207 is mounted mobile in translation in a translation direction globally parallel to the longitudinal axis x on the structure of the nacelle 102. The translation is effected by any appropriate structure or approach such as slides for example.

Figure 3:
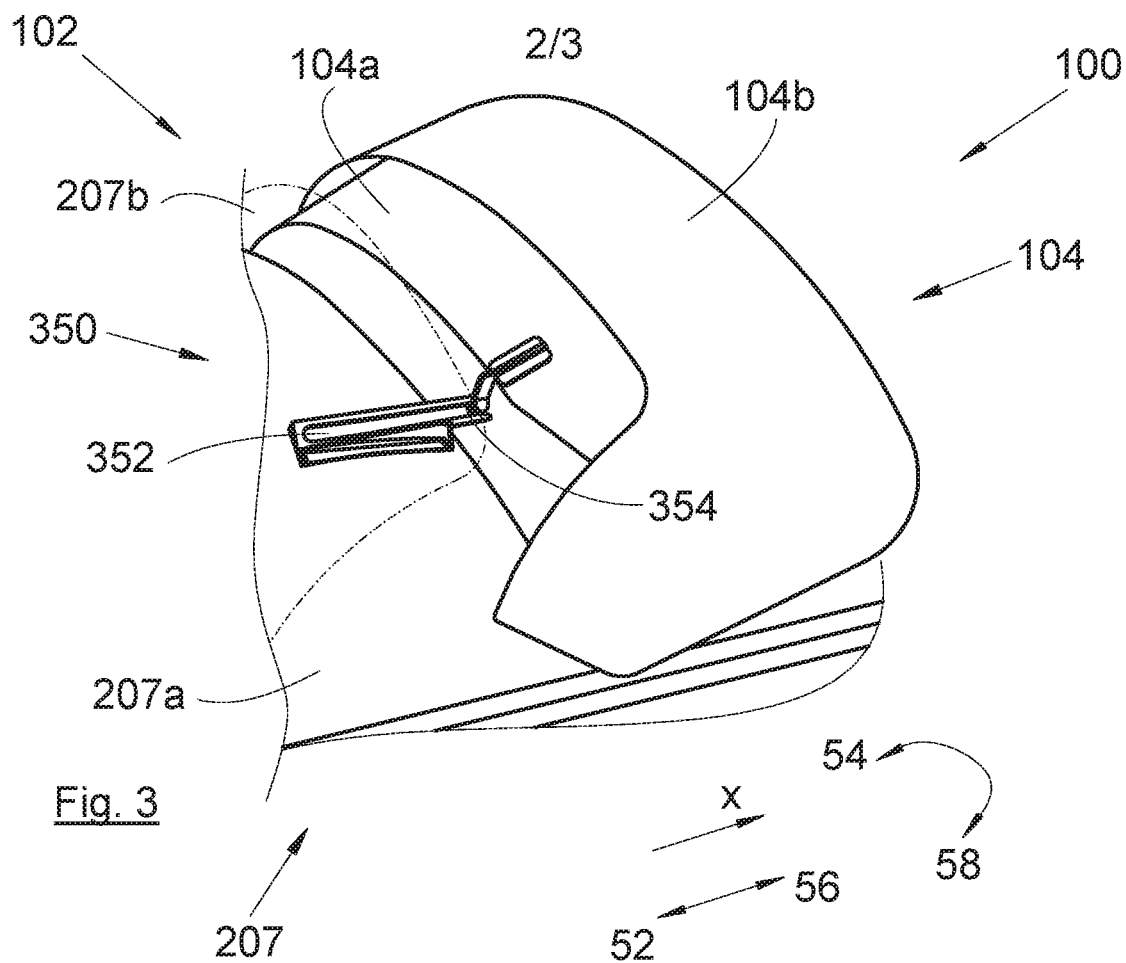
FIG. 3 is a perspective view of the nacelle of FIG. 2 in an intermediate position and with a locking system.

As shown in FIG. 3, the mobile cowl 207 features an interior wall 207a and an exterior wall 207b (shown in dash-dotted lines) that are moved in the same manner and simultaneously. In the same manner, the reverser flap 104 features an interior wall 104a and an exterior wall 104b that are moved in the same manner and simultaneously.

The mobile cowl 207 is mobile between a closing position in which it is close to the fixed cowl 206 and an opening position in which it is far aft of the fixed cowl 206 so as to enlarge the window 210.

Figure 2:
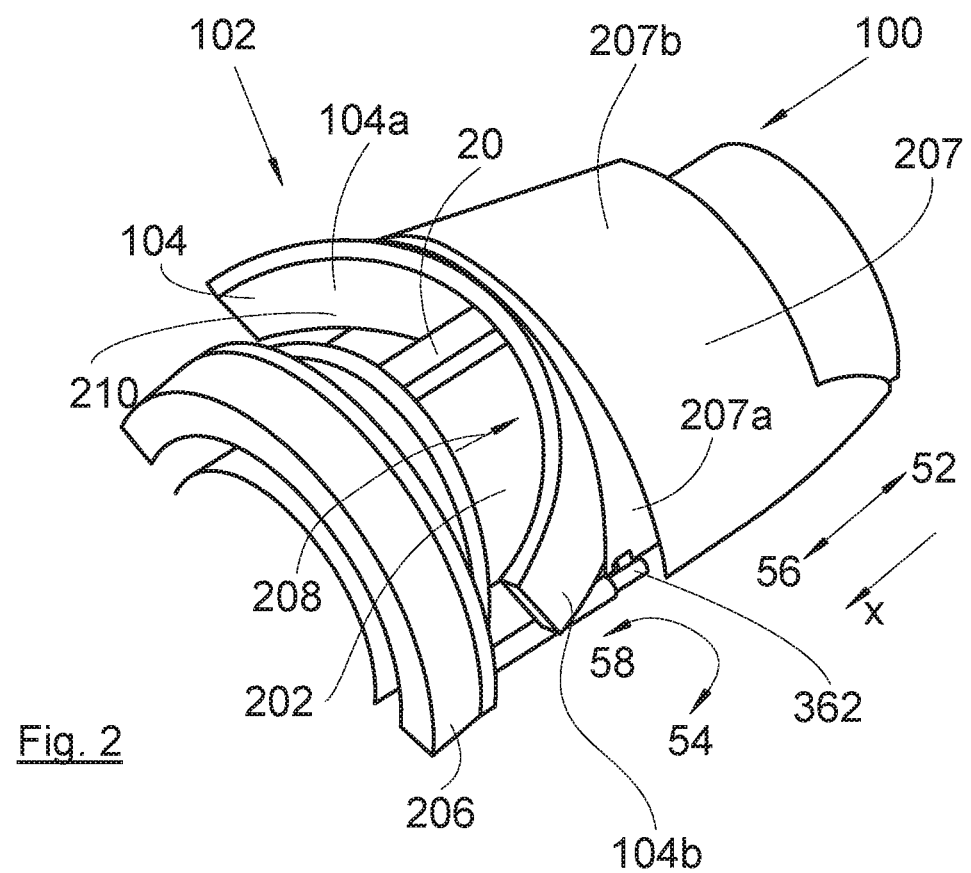
FIG. 2 is a perspective view of the nacelle according to the disclosure herein in an open position.

The reverser flap 104 is mounted mobile in rotation about a rotation axis on the structure of the nacelle 102 between a closed position in which it obstructs the window 210 and an open position in which it does not obstruct the window 210. Here, in the embodiment of the disclosure herein shown in FIGS. 2 and 3, the rotation axis is perpendicular to the longitudinal axis x.

In the closed position, the reverser flap 104 is positioned between the fixed cowl 206 and the mobile cowl 207 which is in the closing position. In the closed position of the reverser flap 104, and in the closing position of the mobile cowl 207, the exterior wall 207b of the mobile cowl 207 and the exterior wall 104b of the reverser flap 104 come to be in the continuation of one another so as to constitute an exterior wall of the nacelle 102. At the same time, the interior wall 207a of the mobile cowl 207 and the interior wall 104a of the reverser flap 104 come to be in the continuation of one another so as to constitute a peripheral surface of the duct 202 around the engine 20.

In the open position, the mobile cowl 207 is moved aft to facilitate the maneuvering of the reverser flap 104 from the closed position to the open position.

When the reverser flap 104 is in the closed position, the exterior wall 104b of the reverser flap 104 extends between the exterior surface of the fixed cowl 206 and the exterior surface 207b of the mobile cowl 207 and its interior surface extends between the interior surface of the fixed cowl 206 and the interior surface of the mobile cowl 207 to delimit the duct 202.

When the reverser flap 104 is in the open position, the reverser flap 104 crosses the duct 202 and deflects at least part of the bypass flow 208 to the outside through the window 210.

The passage of the reverser flap 104 from the closed position to the open position is coordinated but deferred with respect to the passage of the mobile cowl 207 from the closing position to the opening position and vice versa.

This coordination is brought about by a drive mechanism that, starting from the closed position and the closing position, realizes a first combination bringing about:
  an aft translation (arrow 52) of the mobile cowl 207 in a translation direction globally parallel to the longitudinal axis x that brings about the movement of the mobile cowl 207 from the closing position towards the opening position, then, from a certain moment; and
  a rotation (arrow 54) of the reverser flap 104 about the rotation axis that brings about the movement of the reverser flap 104 from the closed position to the open position.

As disclosed, the aft translation of the mobile cowl 207 continues during the rotation of the reverser flap 104.

Conversely, the passage of the reverser flap 104 from the open position to the closed position is assured by the same mechanism that is also adapted or configured to realize a second combination bringing about, from the open position and from the opening position:
  a forward translation (arrow 56) of the mobile cowl 207 in the translation direction that brings about movement of the mobile cowl 207 from the opening position to the closing position; and
  a rotation (arrow 58) in the reverse direction of the reverser flap 104 about the rotation axis that assures the return of the reverser flap 104 from the open position to the closed position.

As disclosed, the forward translation of the mobile cowl 207 starts at the same time as the rotation of the reverser flap 104, then the rotation of the reverser flap 104 stops while the translation of the mobile cowl 207 continues.

According to one particular embodiment, the drive mechanism comprises at least one first actuator 362 mounted between the structure of the nacelle 102, in this case the forward frame 206, and the mobile cowl 207, and more particularly in this case the interior wall 207a. In this case, the actuator 362 is in the form of a jack, but it may adopt another form such as a motor or any other appropriate structure or approach for moving an element in translation.

In addition, the drive mechanism may also comprise at least one second actuator, for example another jack, mounted between the reverser flap 104 and the structure of the nacelle 102, in particular the forward frame 206.

Each actuator can be electric, hydraulic or pneumatic or otherwise. The drive mechanism also comprises a control unit, of the processor type, which orders each actuator to move in one direction or the other in order to bring about the deferred movements described above.

In FIG. 3, the illustrated intermediate position corresponds:
- if the mobile cowl 207 moves from the closing position towards the opening position, at the limit position from which the reverser flap 104 will begin its rotation from its closed position towards its open position; or
- if the mobile cowl 207 moves from the opening position towards the closing position, at the limit position from which the reverser flap 104 will end its rotation from its open position towards its closed position.

Figure 4:
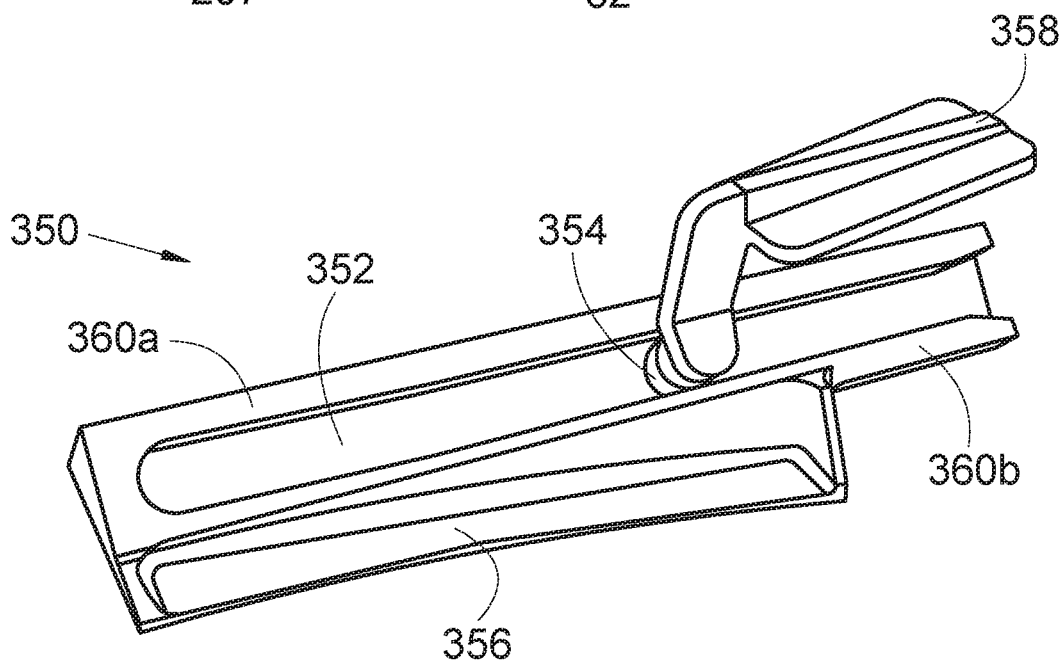
FIG. 4 is a perspective view of the locking system according to a first embodiment of the disclosure herein.
Figure 5:
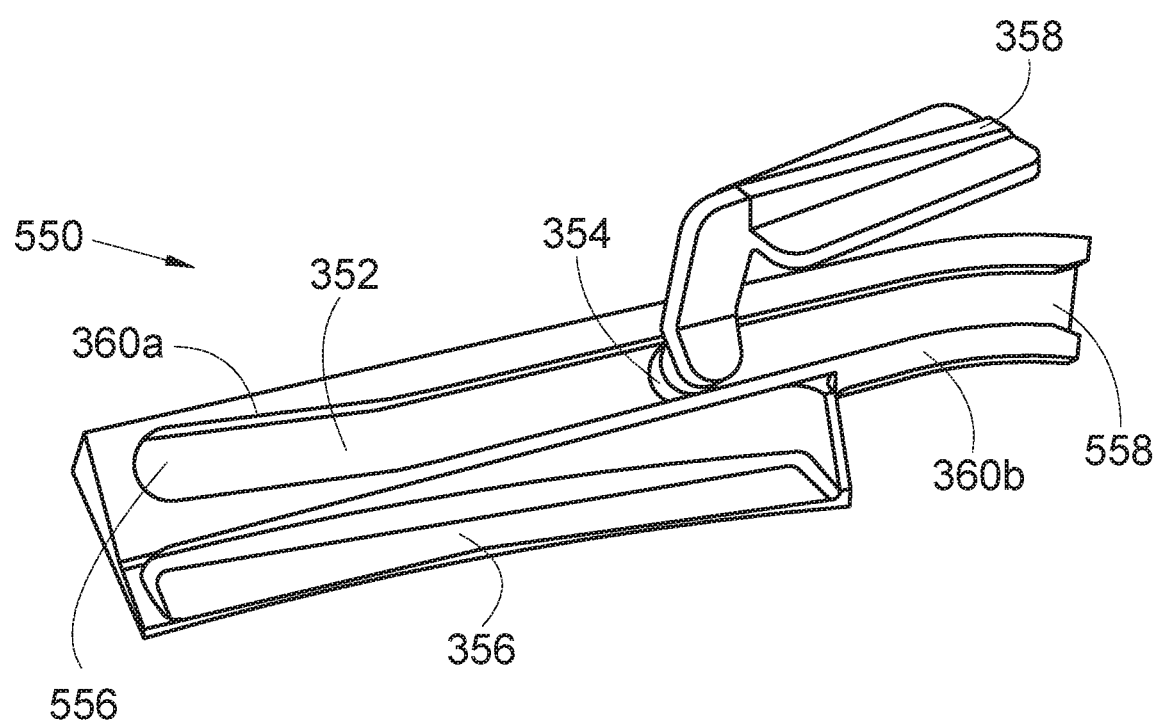
FIG. 5 is a perspective view of the locking system according to different variants.

FIG. 3 also shows a locking system 350, one embodiment of which is shown enlarged in FIG. 4, and variants 550 of which are shown in FIG. 5.

The locking system 350, 550 comprises a groove 352 and a guided element 354.

The groove 352 is bounded laterally by two walls 360a-b that are essentially parallel to the translation direction, in this case the longitudinal axis x. The walls 360a-b are fixed to the mobile cowl 207, and more particularly in this case to its interior wall 207a. Thus, the groove 352 extends essentially parallel to the translation direction, between a first end and a second end. Here, the walls 360a-b are borne by a shoe 356 which is fixed to the mobile cowl 207, for example by screws or rivets.

The guided element 354 is mounted guided in the groove 352 and is fixed to the reverser flap 104, and more particularly in this case to its interior wall 104a. Here, the guided element 254 is borne by a palette 358 which is fixed to the reverser flap 104, for example by screws or rivets.

The forms of the groove 352 and of the walls 360a-b are adapted or configured such that the guided element 354 remains immobile during part of the translation of the mobile cowl 207.

In this case, the guided element 354 is a roller that is mobile in rotation about its axis, but it may adopt another form such as a block. Thus, the guided element 354 can be an element that rolls or slides in the groove 352.

The locking system 350, 550 makes it possible to lock the reverser flap 104 in the closed position when it is not intended to rotate, in particular during part of the forward or aft movement in translation of the mobile cowl 207.

The guided element 354 moves in the groove 352 while the reverser flap 104 does not rotate and the guided element 354 leaves the groove 352 when the reverser flap 104 has to pivot.

The first end of the groove 352 is oriented forward, that is to say towards the reverser flap 104, and is open, that is to say that the groove 352 is not closed such that the guided element 354 is able to leave the groove 352.

The second end has the opposite orientation and is in this case closed. The length of the groove 352 on the side of the second end is sufficient for the guided element 354 not to be able to leave this groove when the mobile cowl 207 is in the closing position.

Thus, from the closing/closed position, the guided element 354 is in the groove 352 on the side of the second end. As the mobile cowl 207 is moved aft by the drive mechanism, the guided element 354 approaches the first end, and while the guided element 354 remains in the groove 352 the reverser flap 104 remains immobile, then, when the guided element 354 leaves the groove 352 by the open end thereof, the reverser flap 104 is free to be able to pivot so as to pass from the closed position to the open position by the action of the drive mechanism.

Thus, the guided element 354 moves from the second end to the first end with the movement of the mobile cowl 207 from its closing position to its opening position, and leaves the groove 352 by the first end when the reverser flap 104 begins its rotation to pass from the closed position to the open position.

The guided element 354 leaves the groove 352 before or at the same time as the reverser flap 104 begins its rotation.

Thus, from the opening/open position, the mobile cowl 207 is moved forward by the drive mechanism and, while the guided element 354 is outside the groove 352, the reverser flap 104 pivots to pass from the open position to the closed position under the action of the drive mechanism, then, when the guided element 354 enters the groove 352 by the open end, the reverser flap 104 remains immobile until the mobile cowl 207 reaches its closing position.

Thus, the guided element 354 moves outside the groove 352 while the reverser flap 104 pivots from its open position to its closed position and while the mobile cowl 207 moves from its opening position to its closing position, and enters the groove 352 by the first end thereof at the end of the rotation of the reverser flap 104, then moves from the first end to the second end with the continued movement of the mobile cowl 207 to its closing position.

The guided element 354 enters the groove 352 after or at the same time as the reverser flap 104 ends its rotation.

The opening of the first end is intended to come to face the guided element 354 when the reverser flap 104 ends its rotation and is in the closed position.

In the embodiment of the disclosure herein presented here, there is a single groove 352 and a single guided element 354 for each reverser flap 104, but it is of course possible to have more in the interests of better support, in particular in the case of a large reverser flap 104.

Putting in place such grooves 352 and such guided elements 354 constrains the reverser flap 104 in the closed position during the movement in translation of the mobile cowl 207 that serves to free the reverser flap 104 before its rotation.

To make it easier for the guided element 354 to enter the groove 354 by the first end thereof, this end is widened.

In the case of FIG. 5, the locking system 550 has a groove 354 of which the first end is extended by an arcuate portion 558 such that, in the direction of movement of the mobile cowl 207, on one hand it aids in initiation of the rotation of the reverser flap 104 from its closed position towards its open position, and on the other hand it accompanies the end of the rotation of the reverser flap 104 from its open position towards its closed position.

FIG. 5 also shows that the second end of the groove 354 has a curvature 556 which orients the second end towards the outside of the nacelle 102 so as to further constrain the reverser flap 104 in its closed position when the mobile cowl 207 is in the closing position.

The disclosure herein has been more particularly described in the case of a nacelle under a wing but can be applied to a nacelle located at the rear of the fuselage.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a turbofan, the nacelle comprising:
   a fixed cowl and a mobile cowl mobile in translation in a translation direction between a closing position in which it is close to the fixed cowl and an opening position in which it is far aft of the fixed cowl;
   an actuator for moving the mobile cowl from the closing position to the opening position, and vice versa;
   a window on an upstream side by the fixed cowl and on a downstream side by the mobile cowl, the window being open between a duct for a bypass flow and an exterior of the nacelle;
   a reverser flap mounted mobile in rotation about a rotation axis between a closed position in which it obstructs the window and an open position in which it does not obstruct the window; and
   a drive mechanism to coordinate and defer passage from the closed position to the open position of the reverser flap with the passage from the closing position to the opening position of the mobile cowl and vice versa, the drive mechanism being configured to realize a first combination bringing about, from the closed position and from the closing position:
   an aft translation of the mobile cowl in the translation direction to move the mobile cowl from the closing position to the opening position, then, from a certain moment:
   a rotation of the reverser flap about the rotation axis to move the reverser flap from the closed position to the open position; and
   wherein the drive mechanism is configured to realize a second combination bringing about, from the open position and from the opening position:
   a forward translation of the mobile cowl in the translation direction to move the mobile cowl from the opening position to the closing position; and
   a rotation in a reverse direction of the reverser flap about the rotation axis to move the reverser flap from the open position to the closed position;
   the nacelle further comprising a locking system comprising:
   a groove bounded laterally by two walls that are essentially parallel to the translation direction and are fixed to the mobile cowl, the groove extending between a first end that is oriented forward and open and a second end; and
   a guided element for being guided in the groove and fixed to the reverser flap, the guided element configured to move from the second end towards the first end with movement of the mobile cowl from its closing position towards its opening position and leaving the groove by the first end when the reverser flap begins its rotation to pass from the closed position to the open position, and the guided element moving outside the groove while the reverser flap pivots from its open position to its closed position and while the mobile cowl moves from its opening position towards its closing position, and entering the groove by its first end at an end of the rotation of the reverser flap, then moving from the first end to the second end with continued movement of the mobile cowl up to its closing position.

2. The nacelle according to claim 1, wherein the first end is widened.

3. The nacelle according to claim 1, wherein the first end is extended by an arcuate portion such that, in the direction of movement of the mobile cowl, it aids in initiation of rotation of the reverser flap from its closed position towards its open position and accompanies the end of the rotation of the reverser flap from its open position towards its closed position.

4. The nacelle according to claim 1, wherein the second end of the groove has a curvature which orients the second end towards outside of the nacelle.

5. A turbofan comprising an engine and a nacelle, surrounding the engine, and in which a duct for a bypass flow is between the nacelle and the engine, the nacelle comprising:
   a fixed cowl and a mobile cowl mobile in translation in a translation direction between a closing position in which it is close to the fixed cowl and an opening position in which it is far aft of the fixed cowl;
   an actuator for moving the mobile cowl from the closing position to the opening position, and vice versa;
   a window on an upstream side by the fixed cowl and on a downstream side by the mobile cowl, the window being open between the duct for the bypass flow and an exterior of the nacelle;
   a reverser flap mounted mobile in rotation about a rotation axis between a closed position in which it obstructs the window and an open position in which it does not obstruct the window; and
   a drive mechanism to coordinate and defer passage from the closed position to the open position of the reverser flap with the passage from the closing position to the opening position of the mobile cowl and vice versa, the drive mechanism being configured to realize a first combination bringing about, from the closed position and from the closing position:
   an aft translation of the mobile cowl in the translation direction to move the mobile cowl from the closing position to the opening position, then, from a certain moment:
   a rotation of the reverser flap about the rotation axis to move the reverser flap from the closed position to the open position; and
   wherein the drive mechanism is configured to realize a second combination bringing about, from the open position and from the opening position:

a forward translation of the mobile cowl in the translation direction to move the mobile cowl from the opening position to the closing position; and a rotation in a reverse direction of the reverser flap about the rotation axis to move the reverser flap from the open position to the closed position;

the nacelle further comprising a locking system comprising:

a groove bounded laterally by two walls that are essentially parallel to the translation direction and are fixed to the mobile cowl, the groove extending between a first end that is oriented forward and open and a second end; and a guided element for being guided in the groove and fixed to the reverser flap, the guided element configured to move from the second end towards the first end with movement of the mobile cowl from its closing position towards its opening position and leaving the groove by the first end when the reverser flap begins its rotation to pass from the closed position to the open position, and the guided element moving outside the groove while the reverser flap pivots from its open position to its closed position and while the mobile cowl moves from its opening position towards its closing position, and entering the groove by its first end at an end of the rotation of the reverser flap, then moving from the first end to the second end with continued movement of the mobile cowl up to its closing position.

6. An aircraft comprising at least one turbofan according to claim 5.

* * * * *